(12) United States Patent
Nakayama

(10) Patent No.: US 10,935,839 B2
(45) Date of Patent: Mar. 2, 2021

(54) DISPLAY DEVICE

(71) Applicant: Panasonic Intellectual Property Management Co., Ltd., Osaka (JP)

(72) Inventor: Kenji Nakayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 45 days.

(21) Appl. No.: 16/377,086

(22) Filed: Apr. 5, 2019

(65) Prior Publication Data

US 2019/0235290 A1 Aug. 1, 2019

Related U.S. Application Data

(63) Continuation of application No. PCT/JP2017/042314, filed on Nov. 27, 2017.

(30) Foreign Application Priority Data

Dec. 2, 2016 (JP) .............................. JP2016-235346

(51) Int. Cl.
*B60K 35/00* (2006.01)
*G02B 27/01* (2006.01)
(Continued)

(52) U.S. Cl.
CPC ............ *G02F 1/1336* (2013.01); *B60K 35/00* (2013.01); *G02B 27/01* (2013.01);
(Continued)

(58) Field of Classification Search
CPC .. H04N 9/3155; H04N 9/3164; H04N 9/3161; H04N 9/3129; H04N 9/3144;
(Continued)

(56) References Cited

U.S. PATENT DOCUMENTS

2009/0160736 A1* 6/2009 Shikita ............... G02B 27/0101
345/7
2014/0119021 A1* 5/2014 Duncan ..................... F21V 9/40
362/276

(Continued)

FOREIGN PATENT DOCUMENTS

JP 6-087043 U 12/1994
JP 11-119147 4/1999
(Continued)

OTHER PUBLICATIONS

International Search Report of PCT application No. PCT/JP2017/042314 dated Jan. 9, 2018.

*Primary Examiner* — Nitin Patel
*Assistant Examiner* — Amen W. Bogale
(74) *Attorney, Agent, or Firm* — Greenblum & Bernstein, P.L.C.

(57) ABSTRACT

A display device includes a fixed light source, a heat dissipator, a liquid-crystal panel, and a controller. The heat dissipator is attached to the light source. The liquid-crystal panel includes a display area and is movable with respect to the light source. The controller controls movement of the liquid-crystal panel to change the distance between the liquid-crystal panel and the light source.

4 Claims, 8 Drawing Sheets

(51) Int. Cl.
  *G09G 3/36*    (2006.01)
  *G02F 1/13*    (2006.01)
  *G02F 1/13357* (2006.01)

(52) U.S. Cl.
  CPC ..... *G02B 27/0101* (2013.01); *G02B 27/0149* (2013.01); *G02F 1/13* (2013.01); *G09G 3/36* (2013.01); *B60K 2370/1529* (2019.05); *B60K 2370/334* (2019.05); *B60K 2370/52* (2019.05); *G02B 2027/0118* (2013.01); *G02B 2027/0154* (2013.01); *G02B 2027/0185* (2013.01); *G02F 2001/133628* (2013.01); *G09G 2320/0626* (2013.01)

(58) Field of Classification Search
  CPC ........ G09G 3/3406; G09G 3/02; G09G 3/025; G09G 3/002; G09G 3/34; G09G 2340/14; G09G 2340/04; G09G 2340/0407; G09G 2380/10; G09G 5/38; G09G 2320/041; G09G 9/00671; G02B 27/48; G02B 27/01; G02B 27/0101; G02B 27/0179; G02B 27/0172; G02B 27/0103; G02B 27/0149; G02B 27/026; G02B 27/0018; G02B 27/0075; G02B 27/0068; G02B 27/0093; G02B 2027/011; G02B 2027/0181; G02B 2027/0183; G02B 2027/0185; G02B 2027/0187; G02B 2027/0105; G02B 2027/0107; G02B 2027/0123; G02B 2027/0127; G02B 2027/0147; G02B 2027/015; G02B 2027/0152; G02B 2027/0154; G02B 2027/0159; G02B 2027/0174; G02B 2027/0172; G02B 2027/0129; G02B 2027/0145; G02B 2027/0125; G02B 21/0072; G02B 5/32; G02B 21/142; G02B 27/0176; G03B 21/2033; G03B 21/2006; G03B 21/2013; G03B 21/202; G03B 21/147; G03B 21/142; G03B 21/145; G03B 21/16; G60R 2300/205; G60R 2300/308; B60K 2370/1529; B60K 2370/167; B60K 2370/16; B60K 2370/333; B60K 2370/334; B60K 2370/52; B60K 2370/152; B60K 2370/1876; B60K 2370/1868; B60K 2370/785; B60K 2370/177; B60K 2370/31; B60K 2370/33; B60K 2370/347; B60K 2370/343; B60K 37/02; B60K 37/04; B60K 35/00; B60K 37/00; H05K 7/2039; H05K 7/20336; G02F 1/133602; G02F 1/133603; G02F 1/1336; G02F 2001/133628

See application file for complete search history.

(56)  References Cited

U.S. PATENT DOCUMENTS

| | | | |
|---|---|---|---|
| 2016/0291325 A1* | 10/2016 | Kasahara | G02B 27/0101 |
| 2017/0329143 A1* | 11/2017 | Svarichevsky | G02B 27/0149 |
| 2018/0015876 A1* | 1/2018 | Yamagata | B60Q 3/12 |
| 2018/0188530 A1* | 7/2018 | Kasazumi | G02B 27/0093 |
| 2018/0246324 A1* | 8/2018 | Hada | G02B 26/08 |
| 2019/0329716 A1* | 10/2019 | Kubota | G02B 27/01 |

FOREIGN PATENT DOCUMENTS

| | | |
|---|---|---|
| JP | 2003-175744 | 6/2003 |
| JP | 2009-132221 A | 6/2009 |
| JP | 2009-150947 A | 7/2009 |
| JP | 2015-112974 | 6/2015 |
| JP | 2015-176130 | 10/2015 |
| JP | 2016-107731 | 6/2016 |
| JP | 2016-117345 | 6/2016 |

\* cited by examiner

DISPLAY DEVICE

CROSS-REFERENCE TO RELATED APPLICATIONS

This application is a U.S. national stage application of the PCT International Application No. PCT/JP2017/042314 filed on Nov. 27, 2017, which claims the benefit of foreign priority of Japanese patent application No. 2016-235346 filed on Dec. 2, 2016, the contents all of which are incorporated herein by reference.

BACKGROUND

1. Technical Field

The present disclosure relates to a display device, and particularly to a display device including a liquid-crystal panel.

2. Description of the Related Art

A head-up display shows speed information, etc., so that while driving, a driver can visually check the speed information, etc., along with a front view overlapping therewith. The sight distance of a driver depends on the speed; the higher the speed, the longer the sight distance. In order to change the display of the head-up display device in accordance with the speed, a zoom projection lens is disposed between a liquid-crystal panel and a mirror, and the zoom projection lens is supported in such a manner as to be movable back and forth parallel to an optical axis (for example, refer to Japanese Unexamined Patent Publication No. H11-119147).

SUMMARY

In the case of moving the zoom projection lens as in Japanese Unexamined Patent Publication No. H11-119147, the position of each lens needs to be accurately controlled, and thus the device grows in size and complexity. Another conceivable method is to move the mirror to change a display distance. In this case, it is necessary to adjust not only the movement of the mirror along the optical axis, but also the angle of the mirror at the same time, and thus the device grows in size and complexity.

The present disclosure provides a technique which changes display in a simple and easy way in accordance with the travel state.

One aspect of the present disclosure is a display device. This display device includes a fixed light source, a heat dissipator, a liquid-crystal panel, and a controller. The heat dissipator is attached to the light source. The liquid-crystal panel includes a display area and is movable with respect to the light source. The controller controls movement of the liquid-crystal panel so as to change the distance between the liquid-crystal panel and the light source.

According to the present disclosure, the display can be changed in a simple and easy way in accordance with the travel state.

DETAILED DESCRIPTION OF PREFERRED EMBODIMENTS

Prior to specifically describing embodiments of the present disclosure, developments that resulted in the present disclosure will be described. The present disclosure relates to a display device used in a head-up display which displays an image at the front of a vehicle as a virtual image. It is generally known that when the distance between the position of a driver and the position of a virtual image (hereinafter referred to as a sight distance) is approximately 2 meters during normal driving, the driver can safely check the virtual image because a slight viewpoint movement of the driver is few. However, during high-speed driving on a freeway or the like, the position of a point of sight of the driver is further forward than that during normal driving. Therefore, the sight distance is preferably greater than 2 meters in consideration of the case of high-speed driving.

In order to change the sight distance, it is necessary to change the optical distance between a liquid-crystal panel and a combiner. As described earlier, in the case of moving a mirror, it is necessary to change not only the linear distance but also the angle in order to make the angle of incidence of a light beam on the combiner constant, and thus the structure becomes complex. Such structural complexity due to the movement of the mirror is reduced by moving, along the optical axis, the display device itself which includes the liquid-crystal panel, instead of moving the mirror. However, since a heat sink used for a light source is also mounted on the display device, the heat sink is also moved. This heat sink has large mass, and thus a drive unit for moving the display device will increase in size.

Hereinafter, embodiments of the present disclosure will be described with reference to the drawings. In the following description, "parallel" and "orthogonal" include not only perfectly parallel and perfectly orthogonal, respectively, but also directions shifted from parallel and orthogonal directions within a margin of error. Also note that "substantially" means being the same in an approximate range.

FIRST EXEMPLARY EMBODIMENT

Figure 1:
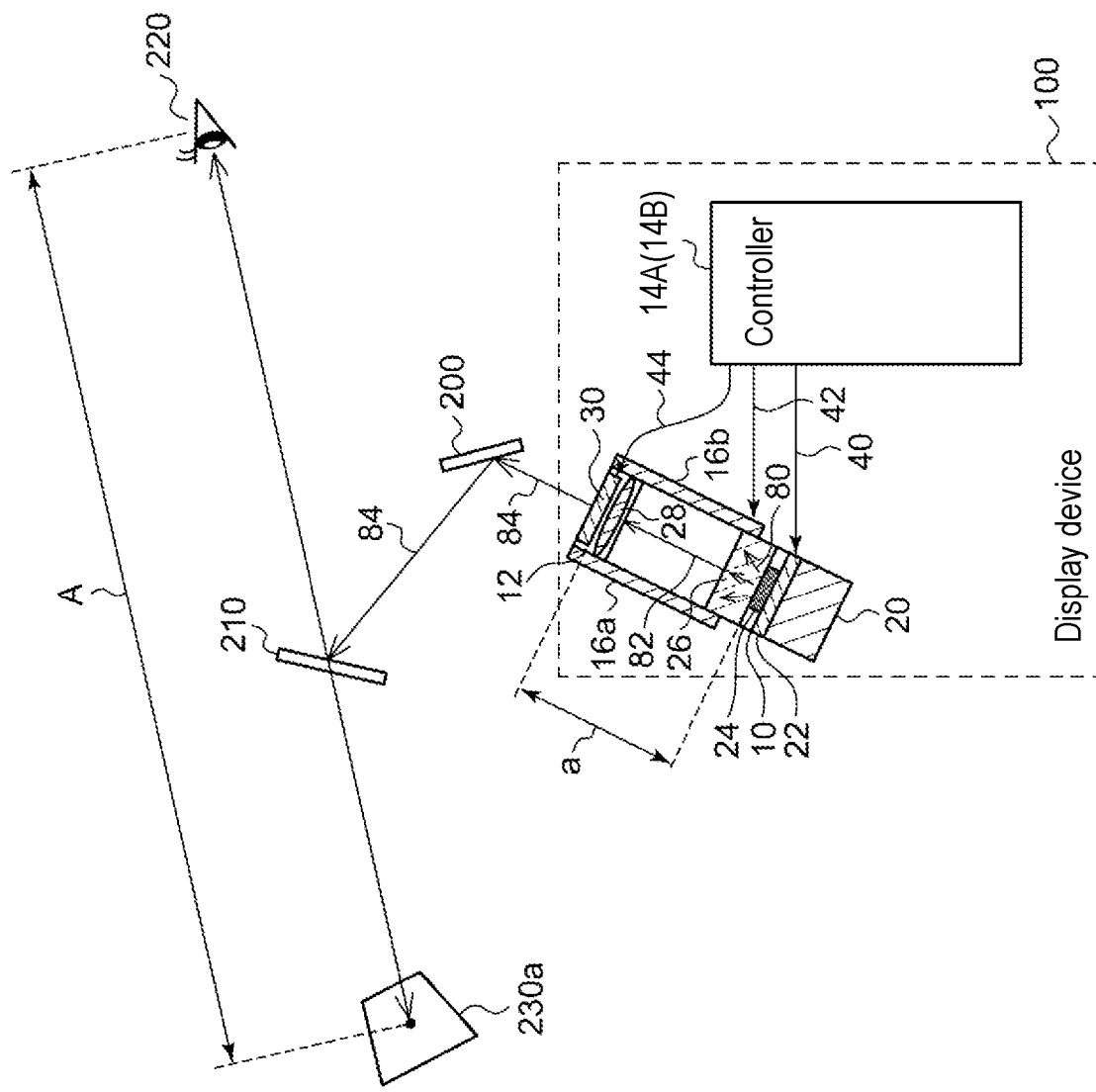
FIG. 1 is a cross-sectional view illustrating a structure of a display device according to a first exemplary embodiment of the present disclosure.

FIG. 1 is a cross-sectional view illustrating a structure of display device 100 according to a first exemplary embodiment. Display device 100 includes fixed casing 10, movable casing 12, controller 14A, first frame 16a, and second frame 16b. Hereinafter, there are cases where first frame 16a and second frame 16b are collectively referred to as frame 16. Fixed casing 10 includes heat dissipator 20, substrate 22, light source 24, and collimating optics system 26, and movable casing 12 includes diffusing optics system 28 and liquid-crystal panel 30. Furthermore, display device 100 includes, as signal lines, first signal line 40, second signal line 42, and third signal lines 44. Moreover, display device 100 is installed in a vehicle together with mirror 200 and combiner 210.

Display device 100 is installed, for example, in an instrument panel (not illustrated in the drawings) of the vehicle. Note that the instrument panel is also called a dashboard. Mirror 200 is installed above display device 100, and combiner 210 is installed above mirror 200. In FIG. 1, a driver seat and a front passenger seat (not illustrated in the drawings) are disposed on the right side of combiner 210, and the line of sight of driver 220 seated in the driver seat is directed ahead of the vehicle while driving. The front side of the vehicle corresponds to the left side in FIG. 1.

Fixed casing 10 is fixed to the vehicle by a fixing member such as a screw. Light source 24 is disposed on substrate 22 in fixed casing 10. Accordingly, light source 24 is also fixed to the vehicle. Light source 24 emits first light beam 80 to collimating optics system 26 as a backlight of liquid-crystal panel 30. Generally, first light beams 80 are emitted radially from light source 24, and thus are not parallel in a direction from fixed casing 10 to movable casing 12. Light source 24 generates heat at the time of emitting first light beams 80 and thus, in order to dissipate this heat, heat dissipator 20 is attached to light source 24 via substrate 22.

Heat dissipator 20 is, for example, a heat sink, and is formed of a metal material having good heat transfer properties such as aluminum, iron, and copper. In order to improve the performance of the heat sink, heat dissipator 20 has a shape that increases a surface area, for example, the form of pinholder or bellows with rods or boards called fins. Thus, heat dissipator 20 is larger in size and larger in mass than light source 24. Heat dissipator 20 is also fixed to a vehicle. First light beams 80 pass through collimating optics system 26, and second light beams 82 output from collimating optics system 26 travel toward liquid-crystal panel 30. Collimating optics system 26 includes a diffuser panel, a light guide plate, etc., and makes first light beams 80 approximately parallel. Accordingly, second light beams 82 are more parallel in the direction from fixed casing 10 to movable casing 12 than first light beams 80 are.

Second light beams 82 pass through diffusing optics system 28 and reach liquid-crystal panel 30. Diffusing optics system 28 causes second light beams 82 to scatter up to a required viewing angle. Liquid-crystal panel 30 displays an image for the head-up display. Second light beams 82 incident on liquid-crystal panel 30 reflect the displayed image, and thus display light 84 is emitted from liquid-crystal panel 30. Diffusing optics system 28 and liquid-crystal panel 30 are included in movable casing 12, and movable casing 12 is formed separately from fixed casing 10.

Mirror 200 is a reflecting member and reflects, toward combiner 210, display light 84 emitted from liquid-crystal panel 30. Combiner 210 includes a base made of, for example, a transparent resin material or sheet glass, and a semi-transparent mirror made of a translucent film including deposited tin, silver, or the like is provided on one side of the base. This translucent film can be said as a reflective film. Combiner 210, which is translucent, is formed so that driver 220 can look ahead of the vehicle through combiner 210. Display light 84 reflected by mirror 200 enters combiner 210.

At least a part of display light 84 incident on combiner 210 is reflected toward driver 220, and thus driver 220 visually checks information projected on combiner 210 while the information overlaps with the scenery ahead of the vehicle. At this time, driver 220 visually checks the information projected on combiner 210 as first virtual image 230a. Examples of this information include an image showing the speed of the vehicle, the remaining amount of fuel, and the like, or an image showing the distance to a destination, a direction of travel, the name of current location, the name of a facility or a shop existing around the current location, and the like.

First frame 16a and second frame 16b are arranged side by side and fixed to fixed casing 10 so as to be substantially parallel to the optical axis of second light beams 82. First frame 16 and second frame 16b support movable casing 12 in such a manner that movable casing 12 is movable substantially parallel to the optical axis of second light beams 82. In other words, movable casing 12 is movable along first frame 16a and second frame 16b, and liquid-crystal panel 30 is movable with respect to light source 24. Controller 14A controls display of display device 100. First signal line 40 from controller 14A transmits a signal for controlling light source 24, second signal line 42 from controller 14A transmits a signal for controlling movable casing 12, and third signal line 44 from controller 14A transmits a signal for controlling liquid-crystal panel 30. The processing performed by controller 14A will be described later.

Figure 2:
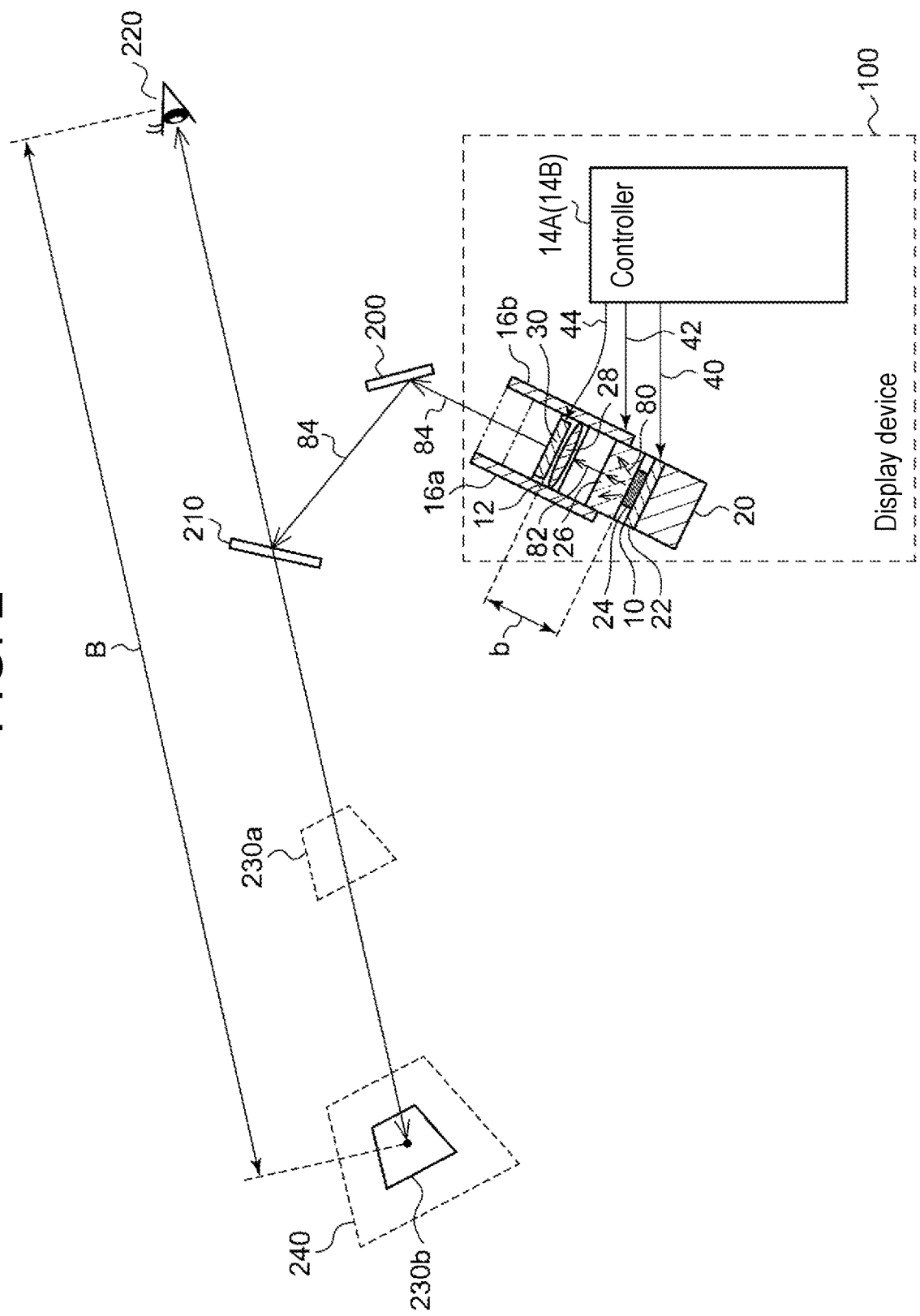
FIG. 2 is a cross-sectional view illustrating another structure of the display device shown in FIG. 1.

FIG. 2 is a cross-sectional view illustrating another structure of display device 100. Display device 100 in FIG. 2 is substantially the same as display device 100 in FIG. 1 except that the arrangement of movable casing 12 is different from that in FIG. 1. To describe specifically, the distance between light source 24 and liquid-crystal panel 30 is denoted by "a" in FIG. 1, but the distance between light source 24 and liquid-crystal panel 30 is denoted by "b" in FIG. 2, and "a" is greater than "b". In other words, the distance between light source 24 and liquid-crystal panel 30 is shorter in FIG. 2 than that in FIG. 1. Therefore, the optical distance between liquid-crystal panel 30 and combiner 210 in FIG. 2 is longer than that in FIG. 1. Hereinafter, the arrangement of movable casing 12 in FIG. 1 will be referred to as a "first arrangement", and the arrangement of movable casing 12 in FIG. 2 will be referred to as a "second arrangement". Controller 14A controls, via second signal line 42, movement of movable casing 12 including liquid-crystal panel 30 so that the distance between liquid-crystal panel 30 and light source 24 changes between the first arrangement and the second arrangement.

In FIG. 2, driver 220 visually checks second virtual image 230b instead of first virtual image 230a. Second virtual image 230b is located further forward of the vehicle than first virtual image 230a. Thus, sight distance B between driver 220 and second virtual image 230b in the second arrangement is greater than sight distance A between driver 220 and first virtual image 230a in the first arrangement. As described earlier, the sight distance during high-speed driving is preferably greater than the sight distance during normal driving. Therefore, it is necessary that first virtual image 230a be generated with the first arrangement during normal driving and that second virtual image 230b be generated with the second arrangement during high-speed driving. Hereinafter, there are cases where first virtual image 230a and second virtual image 230b are collectively referred to as virtual image 230.

Generally, the greater the distance from combiner 210 to virtual image 230, the larger the size of virtual image 230 and the greater the distance between driver 220 and virtual image 230. Therefore, when liquid-crystal panel 30 in the second arrangement displays an image having the same size as that of the image displayed by liquid-crystal panel 30 in the first arrangement, driver 220 may visually check imaginary virtual image 240 at sight distance B. Imaginary virtual image 240 in the second arrangement and first virtual image 230a in the first arrangement have different angles of view when viewed from driver 220. Accordingly, as a result of visually checking virtual images in the first and second arrangements that have different angles of view, driver 220 may feel strange. In order to reduce the difference between the angles of view, controller 14A changes the size of the display area of liquid-crystal panel 30 between the cases of the first arrangement and the second arrangement. This control enables driver 220 to visually check, even in the case of the second arrangement, second virtual image 230b that has an angle of view close to the angle of view of first virtual image 230a.

Furthermore, as the distance from combiner 210 to virtual image 230 increases, the size of an image that is displayed on liquid-crystal panel 30 increases, and thus virtual image 230 becomes darker. Thus, when light source 24 in the second arrangement emits first light beams 80 having the same luminance (or intensity) as that of first light beams 80 emitted from light source 24 in the first arrangement, driver 220 visually checks second virtual image 230b that is darker than first virtual image 230a in the first arrangement. Accordingly, as a result of visually checking virtual images in the first and second arrangements that are different in brightness, driver 220 may feel strange. In order to reduce the difference in the brightness, controller 14A changes the luminance of first light beam 80 which is emitted from light source 24 between the cases of the first arrangement and the second arrangement. This control enables driver 220 to visually check, even in the case of the second arrangement, second virtual image 230b that has brightness close to the brightness of first virtual image 230a.

Figure 3:
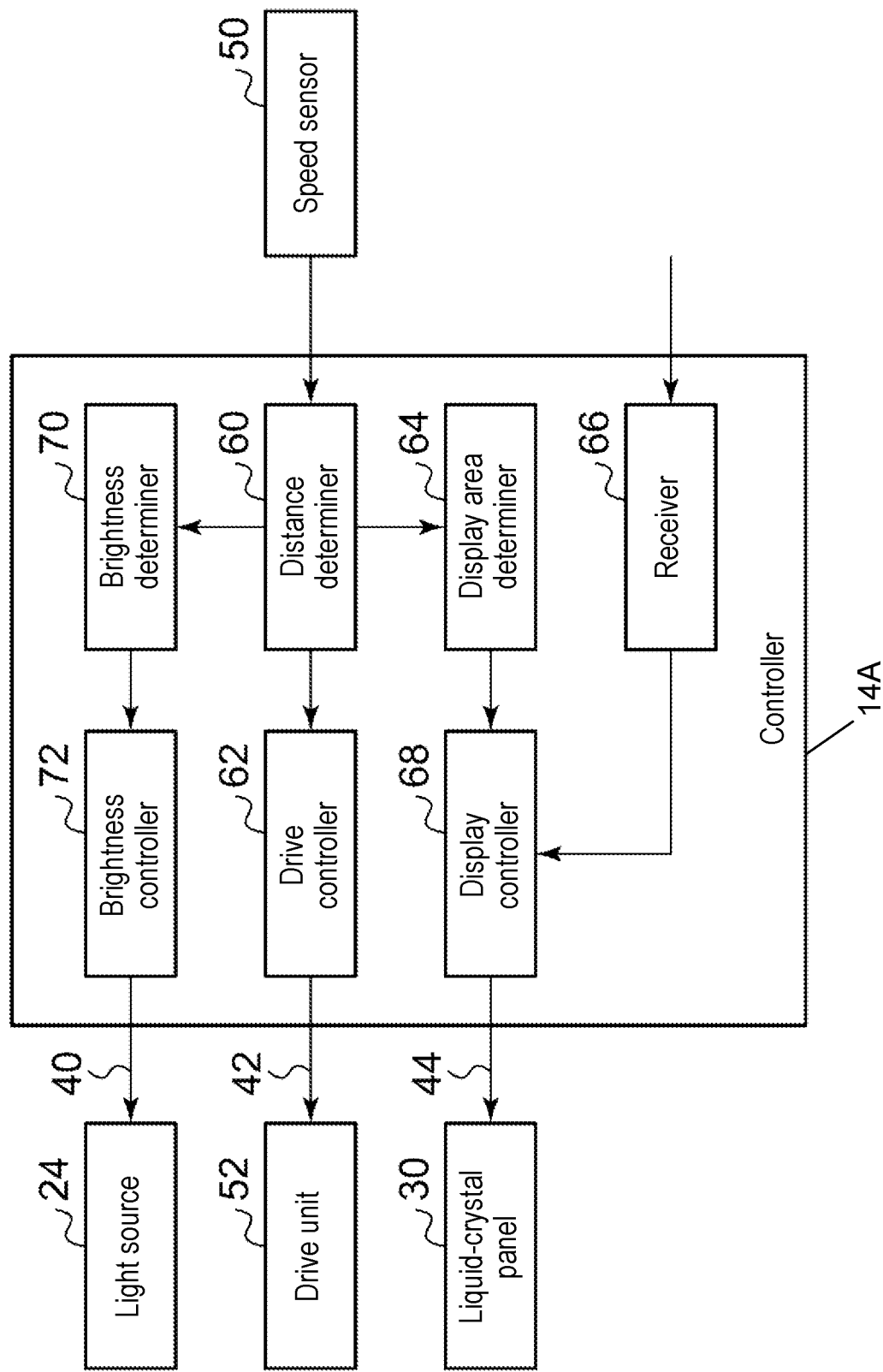
FIG. 3 is a block diagram illustrating a functional configuration of a controller shown in FIG. 1.

FIG. 3 illustrates the configuration of controller 14A. Controller 14A is connected to light source 24, liquid-crystal panel 30, speed sensor 50, and drive unit 52. Controller 14A includes distance determiner 60, drive controller 62, display area determiner 64, receiver 66, display controller 68, brightness determiner 70, and brightness controller 72. First signal line 40 connects light source 24 and brightness controller 72, second signal line 42 connects drive unit 52 and drive controller 62, and third signal line 44 connects liquid-crystal panel 30 and display controller 68.

Figure 4A:
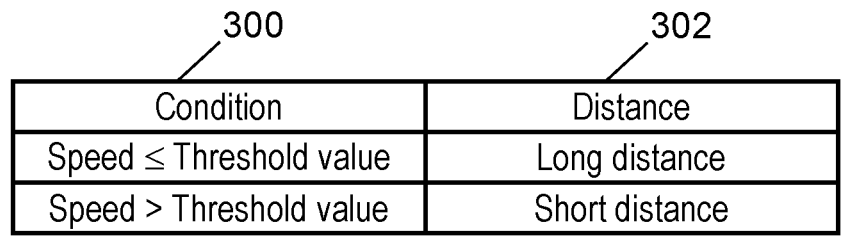
FIG. 4A is a diagram illustrating a data structure of a table in the controller shown in FIG. 3.
Figure 4B:
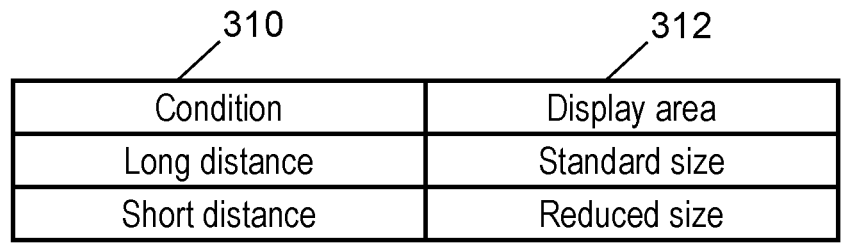
FIG. 4B is a diagram illustrating a data structure of another table in the controller shown in FIG. 3.
Figure 4C:
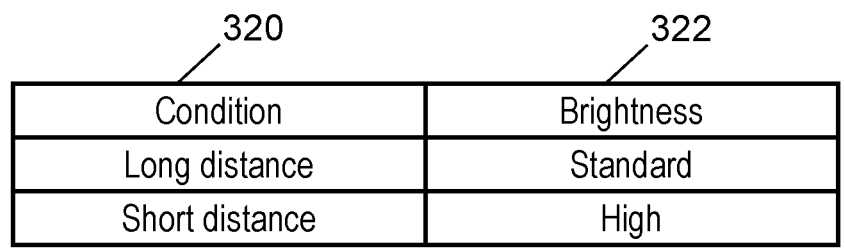
FIG. 4C is a diagram illustrating a data structure of yet another table in the controller shown in FIG. 3.

Speed sensor 50 detects the speed of the vehicle. Description of detection of the speed of the vehicle will be omitted here because it is sufficient that a known technique be used. Speed sensor 50 outputs the detected speed to distance determiner 60. Distance determiner 60 receives the speed from speed sensor 50. Furthermore, distance determiner 60 stores a table to be compared with the speed. FIG. 4A to FIG. 4C illustrate the data structures of the table in controller 14A. FIG. 4A is a table which shows the relationship between the speed and the distance between light source 24 and liquid-crystal panel 30 and includes condition column 300 and distance column 302. When the speed is less than or equal to a threshold value, the distance between light source 24 and liquid-crystal panel 30 is set to "LONG DISTANCE" which is "a". This corresponds to the first arrangement described earlier. On the other hand, when the speed is greater than the threshold value, the distance between light source 24 and liquid-crystal panel 30 is set to "SHORT DISTANCE" which is "b". This corresponds to the second arrangement described earlier. FIG. 4B and FIG. 4C will be described later, and the description returns to FIG. 3. Distance determiner 60 outputs the determined distance to drive controller 62, display area determiner 64, and brightness determiner 70.

Drive controller 62 receives the distance determined by distance determiner 60, and operates drive unit 52 to cause movable casing 12 to move to achieve this distance. Drive unit 52 includes a motor for moving movable casing 12. By driving of drive unit 52, movable casing 12 moves along frame 16 and stops at a position corresponding to control of drive controller 62. For example, movable casing 12 stops at a position that results in the distance between light source 24 and liquid-crystal panel 30 becoming "a" when the distance determined by distance determiner 60 is the long distance, and stops at a position that results in the distance between light source 24 and liquid-crystal panel 30 becoming "b" when the distance determined by distance determiner 60 is the short distance.

Display area determiner 64 receives the distance determined by distance determiner 60, and determines the size of the display area corresponding to the distance. FIG. 4B is a table which shows the relationship between the size of the display area and the distance between light source 24 and liquid-crystal panel 30 and includes condition column 310 and display area column 312. When the distance between light source 24 and liquid-crystal panel 30 is set to "LONG DISTANCE" which is "a", the size of the display area is set to "STANDARD SIZE". The standard size is a predetermined size which is, for example, the largest possible size of an image that can be displayed on liquid-crystal panel 30. On the other hand, when the distance between light source 24 and liquid-crystal panel 30 is set to "SHORT DISTANCE" which is "b", the size of the display area is set to "REDUCED SIZE". The reduced size is smaller than the standard size.

Figure 5:
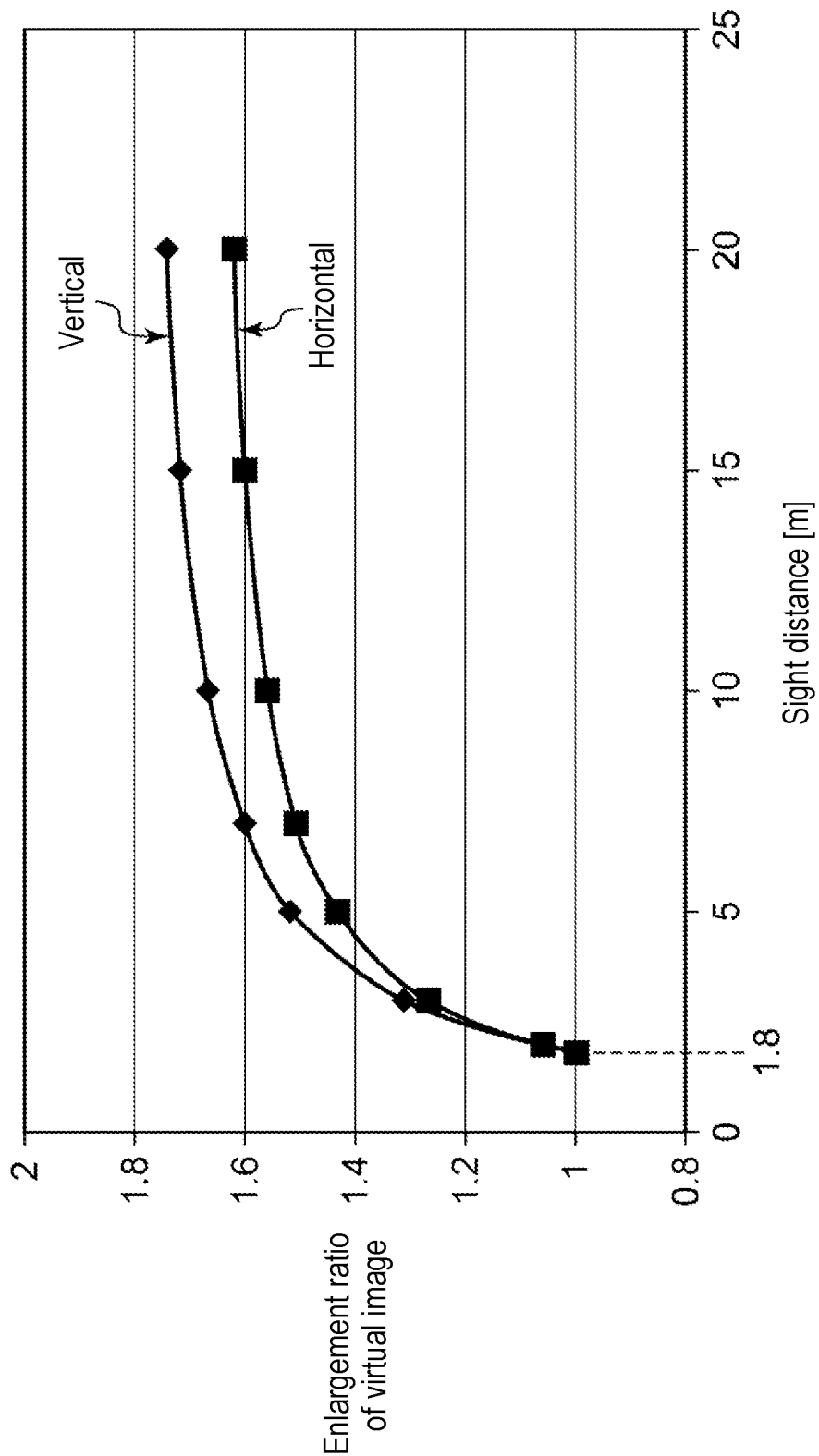
FIG. 5 is a diagram illustrating the relationship between a sight distance and an enlargement ratio of a virtual image in the display device shown in FIG. 1.

In order to describe the reduced size in more detail, FIG. 5 is used now. FIG. 5 illustrates the relationship between the sight distance and the enlargement ratio of virtual image 230 in display device 100. Here, assume that the sight distance "A" is "1.8 m" and the size of virtual image 230 in this case is defined by the enlargement ratio "1". The size of the display area of liquid-crystal panel 30 at this time is "STANDARD SIZE". As illustrated in FIG. 5, as the sight distance increases, virtual image 230 expands horizontally and vertically. At this time, if the display area is reduced at the same ratio at which the virtual image has expanded, the size of virtual image 230 does not change, and the sight distance increases. In such a case, the visibility from driver 220 deteriorates as compared to that prior to the change of the sight distance. In order to suppress such an event, the angle of view is preferably substantially constant even when the sight distance changes. In order that the angle of view for virtual image 230 is approximately constant despite an increase in the sight distance, "REDUCED SIZE" is determined on the basis of a reciprocal "1/H" of a horizontal enlargement ratio "H" and a reciprocal "1/V" of a vertical enlargement ratio "V" that correspond to the sight distance "B". To specifically describe, the horizontal length of an image of the reduced size is "1/H" of the horizontal length of an image of the standard size, and the vertical length of the image of the reduced size is "1/V" of the vertical length of an image of the standard size. FIG. 4C will be described later, and the description returns to FIG. 3. Display area determiner 64 outputs the size of the display area to display controller 68.

Display controller 68 receives the size of the display area determined by display area determiner 64, and adjusts the size of the display area of liquid-crystal panel 30. Furthermore, display controller 68 causes an image received from receiver 66 to be displayed in the display area of liquid-crystal panel 30. In this way, the size of the display area of liquid-crystal panel 30 can be changed in accordance with the distance between liquid-crystal panel 30 and light source 24.

Brightness determiner 70 receives the distance determined by distance determiner 60, and determines the brightness of light source 24 in accordance with the distance. The brightness herein corresponds to the luminance, for example. FIG. 4C is a table which shows the relationship between the brightness of light source 24 and the distance between light source 24 and liquid-crystal panel 30, and includes condition column 320 and brightness column 322. When the distance between light source 24 and liquid-crystal panel 30 is "LONG DISTANCE" which is "a", the brightness of light source 24 is set to "STANDARD". The standard is a predetermined level of brightness. On the other hand, when the distance between light source 24 and liquid-crystal panel 30 is "SHORT DISTANCE" which is "b", the brightness of light source 24 is set to "HIGH". "HIGH" is brighter than "STANDARD". The description returns to FIG. 3. Brightness determiner 70 outputs the brightness to brightness controller 72.

Brightness controller 72 receives the brightness of light source 24 determined by brightness determiner 70, and adjusts the brightness of light source 24. In this way, the brightness of first light beam 80 which is emitted from light source 24 can be changed in accordance with the distance between liquid-crystal panel 30 and light source 24.

This configuration can be provided using arbitrary ones of a central processing unit (CPU), a memory, and other large scale integrations (LSI) of a computer in terms of hardware and can be provided using a program loaded on the memory in terms of software, and function blocks formed by linking these elements are illustrated herein. Thus, these function blocks can be provided in various forms including the hardware (dedicated circuit) only or a combination of the hardware (general-purpose circuit) and the software.

Figure 6:
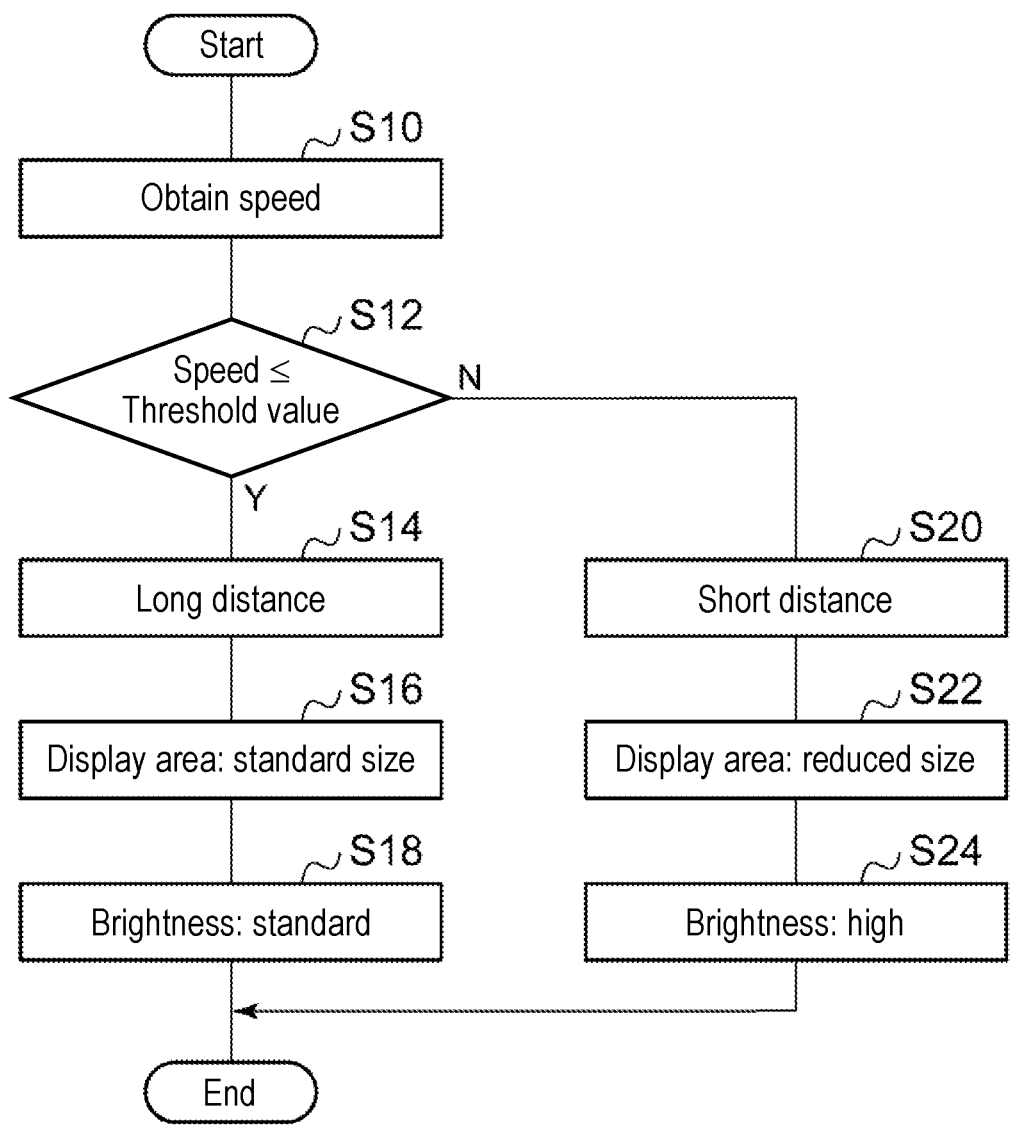
FIG. 6 is a flowchart indicating display processes of the display device shown in FIG. 1.

Operations of display device 100 having the above configuration will be described. FIG. 6 is a flowchart indicating display processes of display device 100. Distance determiner 60 obtains the speed (S10). When the speed is less than or equal to the threshold value (Y in S12), distance determiner 60 selects "LONG DISTANCE" (S14). Display area determiner 64 selects "STANDARD SIZE" as the display area (S16). Brightness determiner 70 selects "STANDARD" as the brightness (S18). When the speed is greater than the threshold value (N in S12), distance determiner 60 selects "SHORT DISTANCE" (S20). Display area determiner 64 selects "REDUCED SIZE" as the display area (S22). Brightness determiner 70 selects "HIGH" as the brightness (S24).

According to the present embodiment, the liquid-crystal panel is moved with respect to the light source while the heat dissipator and the light source remain fixed, and thus the distance between the liquid-crystal panel and the combiner can be changed. Furthermore, since the distance between the liquid-crystal panel and the combiner is changeable, it is possible to change the sight distance. Moreover, since the liquid-crystal panel is moved with respect to the light source while the heat dissipator and the light source remain fixed, the mass of a moving portion can be reduced. Furthermore, since the mass of the moving portion is reduced, an increase in the size of the drive unit can be suppressed. In addition, since the sight distance is changeable, it is possible to easily change display in accordance with the travel state.

Furthermore, since the size of the display area is changed in accordance with the distance between the liquid-crystal panel and the light source, the angle of view for visually checking the virtual image can be approximately constant despite a change in the distance to the virtual image. Moreover, since the angle of view for visually checking the virtual image is approximately constant, it is possible to reduce the feeling of strangeness that a driver has when visually checking the virtual image. In addition, since the brightness is changed in accordance with the distance between the liquid-crystal panel and the light source, the occurrence of the virtual image becoming dark can be reduced even when the distance to the virtual image increases. Furthermore, since the occurrence of the virtual image becoming dark is reduced even when the distance to the virtual image increases, it is possible to reduce the feeling of strangeness that the driver has when visually checking the virtual image. Moreover, since the distance between the liquid-crystal panel and the light source is changed in accordance with the speed of a vehicle, display suitable for the speed can be provided.

SECOND EXEMPLARY EMBODIMENT

Next, a second exemplary embodiment will be described. The second exemplary embodiment relates to a display device used in a head-up display which displays an image at the front of a vehicle as a virtual image, as same as the first exemplary embodiment. In the first exemplary embodiment, the movable casing is moved in accordance with the speed of the vehicle. In contrast, in the second exemplary embodiment, the movable casing is moved in accordance with the type of a road on which the vehicle is traveling. Display device 100 according to the second exemplary embodiment is of the same type as that in FIG. 1 and FIG. 2. Here, differences from the first exemplary embodiment will be mainly described.

Figure 7:
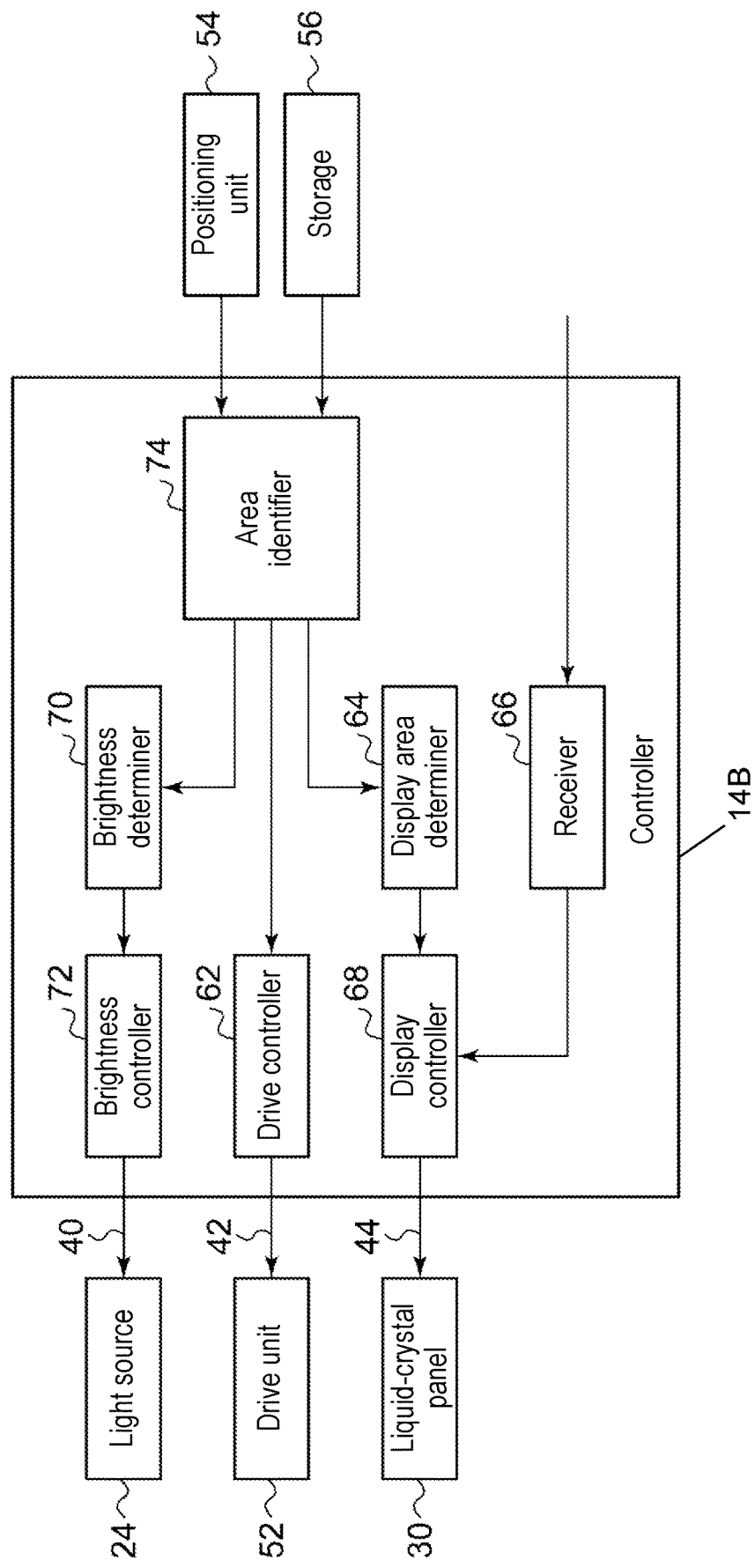
FIG. 7 is a block diagram illustrating a functional configuration of a controller according to a second exemplary embodiment of the present disclosure.

FIG. 7 illustrates the configuration of controller 14B according to the second exemplary embodiment. Controller 14B includes area identifier 74 instead of distance determiner 60 illustrated in FIG. 3. Area identifier 74 is connected to positioning unit 54 and storage 56. Positioning unit 54 obtains position information of the vehicle. A known technique may be used to obtain the position information. For example, the position information is obtained through satellite positioning, positioning using the autonomous navigation, or a combination thereof. Alternatively, the position information may be obtained through map matching. Positioning unit 54 regularly outputs the obtained position information to area identifier 74. Storage 56 stores a road map. Each road is associated with information of a road type. Examples of the road type include a freeway and an ordinary road.

Figure 8:
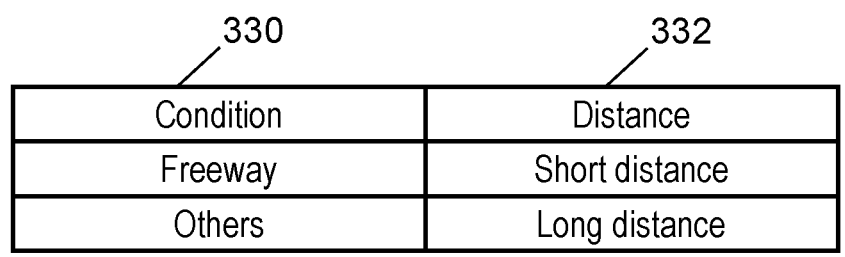
FIG. 8 is a diagram illustrating a data structure of a table in the controller shown in FIG. 7.

Area identifier 74 identifies the type of the road on which the vehicle is traveling by associating the position information obtained by positioning unit 54 with the road map stored in storage 56. Furthermore, area identifier 74 stores a table to be compared with the type of the road. FIG. 8 illustrates the data structure of the table in controller 14B. The table shows the relationship between the road type and the distance between light source 24 and liquid-crystal panel 30, and includes condition column 330 and distance column 332. When the road type is the freeway, the distance between light source 24 and liquid-crystal panel 30 is set to "SHORT DISTANCE" which is "b". This corresponds to the second arrangement described earlier. On the other hand, when the road type is other than the freeway, the distance between light source 24 and liquid-crystal panel 30 is set to "LONG DISTANCE" which is "a". This corresponds to the first arrangement described earlier. Note that the area that is set to "SHORT DISTANCE" is not limited to the freeway. The description returns to FIG. 7. Area identifier 74 outputs the determined distance to drive controller 62, display area determiner 64, and brightness determiner 70. This means that controller 14B changes the distance between liquid-crystal panel 30 and light source 24 in accordance with the area in which a vehicle is traveling.

According to the present embodiment, the distance between the liquid-crystal panel and the light source is changed in accordance with the area in which the vehicle is traveling, and thus it is possible to provide display suitable for the area. Furthermore, the sight distance is set long when the vehicle is traveling on a freeway, and the sight distance is set short when a vehicle is traveling in an area other than a freeway, and thus it is possible to provide display suitable for the road on which the vehicle is traveling.

One aspect of the present disclosure is summarized below. A display device according to an aspect of the present disclosure includes: a light source which is fixed; a heat dissipator attached to the light source; a liquid-crystal panel movable with respect to the light source; and a controller which controls movement of the liquid-crystal panel so as to change the distance between the liquid-crystal panel and the light source.

According to this aspect, the liquid-crystal panel is moved with respect to the light source while the heat dissipator and the light source remain fixed, and thus it is possible to easily change display in accordance with the travel state.

The size of the display area of the liquid-crystal panel may be changed in accordance with the distance between the liquid-crystal panel and the light source. In this case, the size of the display area is changed in accordance with the distance between the liquid-crystal panel and the light source, and thus the angle of view for visually checking the virtual image can be approximately constant despite a change in the distance to the virtual image.

The brightness of light that is emitted from the light source may be changed in accordance with the distance between the liquid-crystal panel and the light source. In this case, the brightness is changed in accordance with the distance between the liquid-crystal panel and the light source, and thus the occurrence of the virtual image becoming dark can be reduced even when the distance to the virtual image increases.

The present display device may be mounted to a vehicle, and the controller may change the distance between the liquid-crystal panel and the light source in accordance with the speed of the vehicle. In this case, the distance between the liquid-crystal panel and the light source is changed in accordance with the speed of the vehicle, and thus it is possible to provide display suitable for the speed.

The present display device may be mounted to a vehicle, and the controller may change the distance between the liquid-crystal panel and the light source in accordance with the area in which the vehicle is traveling. In this case, the distance between the liquid-crystal panel and the light source is changed in accordance with the area in which the vehicle is traveling, and thus it is possible to provide display suitable for the area.

Thus far, the present disclosure has been described by way of the exemplary embodiments. These embodiments are merely illustrative, and a person skilled in the art will appreciate that various modifications can be made to the combination of the structural elements and the operation processes described in these embodiments and that such modifications are within the scope of the present disclosure.

In the first and second exemplary embodiments, the distance between light source 24 and liquid-crystal panel 30 is changeable between two levels, and thus the sight distance is also changeable between two levels. This is, however, not limiting; for example, the distance between light source 24 and liquid-crystal panel 30 may be continuously changed, the brightness may also be continuously changed, and the sight distance may also be continuously changed. This modification enables greater flexibility in configuration.

In the first and second exemplary embodiments, display area determiner 64 controls the display area, and brightness determiner 70 controls the brightness. This is, however, not limiting; for example, display area determiner 64 and brightness determiner 70, or one of display area determiner 64 and brightness determiner 70 may be omitted. This modification allows the configuration to be simplified.

The display device according to the present disclosure is applicable to a head-up display device mounted to a vehicle.

What is claimed is:

1. A display device comprising:
a light source which is fixed;
a heat dissipator attached to the light source;
a liquid-crystal panel configured to display a virtual image and including a display area and being movable with respect to the light source; and
a controller which, in operation, controls movement of the liquid-crystal panel so as to change a distance between the liquid-crystal panel and the light source,
wherein a size of the display area of the liquid-crystal panel is changeable in accordance with the distance between the liquid-crystal panel and the light source, such that an angle of view of the virtual image remains constant when viewed from a vehicle driver viewpoint, the angle of view being an angular extent of the virtual image that is displayed by the liquid-crystal panel.

2. The display device according to claim 1,
wherein brightness of light that is emitted from the light source is to be changed in accordance with the distance between the liquid-crystal panel and the light source, and
wherein the brightness of light emitted from the light source increases as the distance between the liquid-crystal panel and the light source decreases.

3. The display device according to claim 1,
wherein the display device is to be mounted to a vehicle, and
the controller changes the distance between the liquid-crystal panel and the light source in accordance with a speed of the vehicle.

4. The display device according to claim 1,
wherein the display device is to be mounted to a vehicle, and the controller changes the distance between the liquid-crystal panel and the light source in accordance with an area in which the vehicle is traveling.

* * * * *